United States Patent
Kataoka et al.

(10) Patent No.: US 9,430,146 B1
(45) Date of Patent: Aug. 30, 2016

(54) DENSITY-BASED FILTERING OF GESTURE EVENTS ASSOCIATED WITH A USER INTERFACE OF A COMPUTING DEVICE

(71) Applicant: Google Inc., Mountain View, CA (US)

(72) Inventors: Satoshi Kataoka, Tokyo (JP); Keisuke Kuroyanagi, Tokyo (JP)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 14/179,270

(22) Filed: Feb. 12, 2014

Related U.S. Application Data

(63) Continuation of application No. 13/750,694, filed on Jan. 25, 2013, now Pat. No. 8,704,792.

(60) Provisional application No. 61/716,439, filed on Oct. 19, 2012.

(51) Int. Cl.
  *G06F 17/00* (2006.01)
  *G06F 3/0488* (2013.01)

(52) U.S. Cl.
  CPC .................. *G06F 3/04886* (2013.01)

(58) Field of Classification Search
  None
  See application file for complete search history.

(56) References Cited

U.S. PATENT DOCUMENTS

| | | | |
|---|---|---|---|
| 6,286,064 B1 | 9/2001 | King et al. | |
| 6,292,179 B1 | 9/2001 | Lee | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,453,439 B1 | 11/2008 | Kushler et al. | |
| 7,508,324 B2 | 3/2009 | Suraqui | |
| 7,706,616 B2 | 4/2010 | Kristensson et al. | |
| 7,716,579 B2 | 5/2010 | Gunn et al. | |

(Continued)

FOREIGN PATENT DOCUMENTS

WO 2012139266 A1 10/2012

OTHER PUBLICATIONS

Natasha Lomas, "Hey Apple, What the Next iPhone Really, Really Needs Is a Much Better Keyboard," Retrieved from the Internet http://techcrunch.com/2013/04/21/the-iphone-keyboard-stinks/?, Apr. 21, 2013, 7 pp.

(Continued)

*Primary Examiner* — Keith Bloomquist
(74) *Attorney, Agent, or Firm* — Shumaker & Sieffert, P.A.

(57) ABSTRACT

In one example, a computing device may receive an indication of a user input entered at a location of a presence-sensitive screen and defines a group of gesture events based at least in part on the indication. The computing device may determine a density of a portion of the group of gesture events. The density may indicate, for example, a quantity of gesture events associated with a region of the presence-sensitive screen over a time duration. In response to determining that the density satisfies a threshold, the computing device may modify the group of gesture events based at least in part on the density.

18 Claims, 6 Drawing Sheets

(56) References Cited

U.S. PATENT DOCUMENTS

| | | |
|---|---|---|
| 7,750,891 B2 | 7/2010 | Stephanick et al. |
| 7,782,307 B2 | 8/2010 | Westerman et al. |
| 7,921,361 B2 | 4/2011 | Gunn et al. |
| 8,036,878 B2 | 10/2011 | Assadollahi |
| 8,135,582 B2 | 3/2012 | Suraqui |
| 8,237,681 B2 * | 8/2012 | Stephanick ............ G06F 3/0236 178/18.01 |
| 8,237,682 B2 | 8/2012 | Stephanick et al. |
| 2004/0140956 A1 | 7/2004 | Kushler et al. |
| 2005/0012723 A1 | 1/2005 | Pallakoff |
| 2006/0119582 A1 | 6/2006 | Ng et al. |
| 2006/0176283 A1 | 8/2006 | Suraqui |
| 2006/0227116 A1 | 10/2006 | Zotov et al. |
| 2007/0070052 A1 | 3/2007 | Westerman et al. |
| 2008/0316183 A1 | 12/2008 | Westerman et al. |
| 2009/0007001 A1 | 1/2009 | Morin et al. |
| 2010/0131447 A1 | 5/2010 | Creutz et al. |
| 2010/0235794 A1 * | 9/2010 | Ording .................. G06F 3/0485 715/863 |
| 2011/0122081 A1 | 5/2011 | Kushler |
| 2011/0248948 A1 | 10/2011 | Griffin et al. |
| 2012/0036469 A1 | 2/2012 | Suraqui |
| 2012/0056818 A1 * | 3/2012 | Shafi .................. G06F 3/04883 345/173 |
| 2012/0169619 A1 | 7/2012 | Golovchenko |
| 2013/0246861 A1 | 9/2013 | Colley et al. |
| 2014/0028603 A1 | 1/2014 | Xie et al. |

OTHER PUBLICATIONS

Prosecution History from U.S. Appl. No. 13/750,694, dated May 14, 2013 through Dec. 6, 2013, 45 pp.
U.S. Appl. No. 60/430,338, by Daniel Suraqui, filed Nov. 29, 2002.
U.S. Appl. No. 60/505,724 by Daniel Suraqui, filed Sep. 22, 2003.
U.S. Appl. No. 13/739,841, filed Jan. 11, 2013.
U.S. Appl. No. 13/889,146, filed May 7, 2013.
U.S. Appl. No. 131750,694, filed Jan. 25, 2013.

* cited by examiner

DENSITY-BASED FILTERING OF GESTURE EVENTS ASSOCIATED WITH A USER INTERFACE OF A COMPUTING DEVICE

This application is a Continuation of application Ser. No. 13/750,694, filed on Jan. 25, 2013, which claims the benefit of U.S. Provisional Application No. 61/716,439, filed Oct. 19, 2012, the entire content of each of which are hereby incorporated by reference.

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "combo gesture keyboard," or "gesture keyboard") with which the user can interact by inputting a continuous gesture that indicates a word to be input to the computing device (e.g., by sliding his or her finger over various regions of the presence-sensitive display associated with desired keys of the keyboard). In this way, continuous-gesture graphical keyboards allow a user to enter a word or group of words with a single gesture. As such, a continuous-gesture graphical keyboard may allow the user to achieve a certain degree of input efficiency.

However, some continuous-gesture keyboards have certain drawbacks. For example, some computing devices generate touch events when a user performs a gesture at a presence-sensitive screen at which a gesture graphical keyboard is currently displayed. The touch events may include, for example, representations of different locations of the presence-sensitive screen that have been traversed by the user's finger as she performs the gesture. However, in some examples, when the user performs gestures including one or more changes in direction having a high degree of curvature (e.g., inflection points), a density of such touch events (i.e., a number of touch events generated over a given time interval) may increase considerably. In some examples, such a high-density of touch events may consume significant processing resources on the computing device and may result in inaccurate selections of keys in the graphical keyboard and less-accurate candidate word predictions. As such, gestures including a high degree of curvature or other such features corresponding to the gesture (e.g., speed, distance, etc.) may result in inaccurate text entry that reduces the speed at which the user is able to interact with the computing device.

SUMMARY

In one example, the disclosure is directed to a method that may include receiving, by a computing device, an indication of a user input entered at a location of a presence-sensitive screen. The method may further include generating, by the computing device and based at least in part on the indication, a group of gesture events based on the indication of the user input. The method may further include determining, by the computing device, a density of a portion of the group of gesture events. The density may indicate a quantity of gesture events associated with a region of the presence-sensitive screen. In response to determining that the density satisfies a threshold, the method may further include modifying, by the computing device and based at least in part on the density, the group of gesture events.

In another example, the disclosure is directed to a computer-readable storage medium encoded with instructions that, when executed, cause at least one processor of a computing device to receive an indication of a user input entered at a location of a presence-sensitive screen. The instructions, when execute, may further cause the at least one processor of the computing device to generate, based at least in part on the indication, a group of gesture events based on the indication of the user input. The instructions, when execute, may further cause the at least one processor of the computing device to determine, a density of a portion of the group of gesture events. The density may indicate a quantity of gesture events associated with a region of the presence-sensitive screen. In response to determining that the density satisfies a threshold, the instructions, when execute, may further cause the at least one processor of the computing device to modify, based at least in part on the density, the group of gesture events.

In another example, the disclosure is directed to a computing device comprising at least one processor wherein the at least one processor is configured to receive an indication of a user input entered at a location of a presence-sensitive screen. The at least one processor may be further configured to generate, based at least in part on the indication, a group of gesture events based on the indication of the user input. The at least one processor may be further configured to determine, a density of a portion of the group of gesture events. The density may indicate a quantity of gesture events associated with a region of the presence-sensitive screen. In response to determining that the density satisfies a threshold, the at least one processor may be further configured to modify, based at least in part on the density, the group of gesture events.

The details of one or more examples are set forth in the accompanying drawings and the description below. Other features, objects, and advantages of the disclosure will be apparent from the description and drawings, and from the claims.

DETAILED DESCRIPTION

Figure 1:
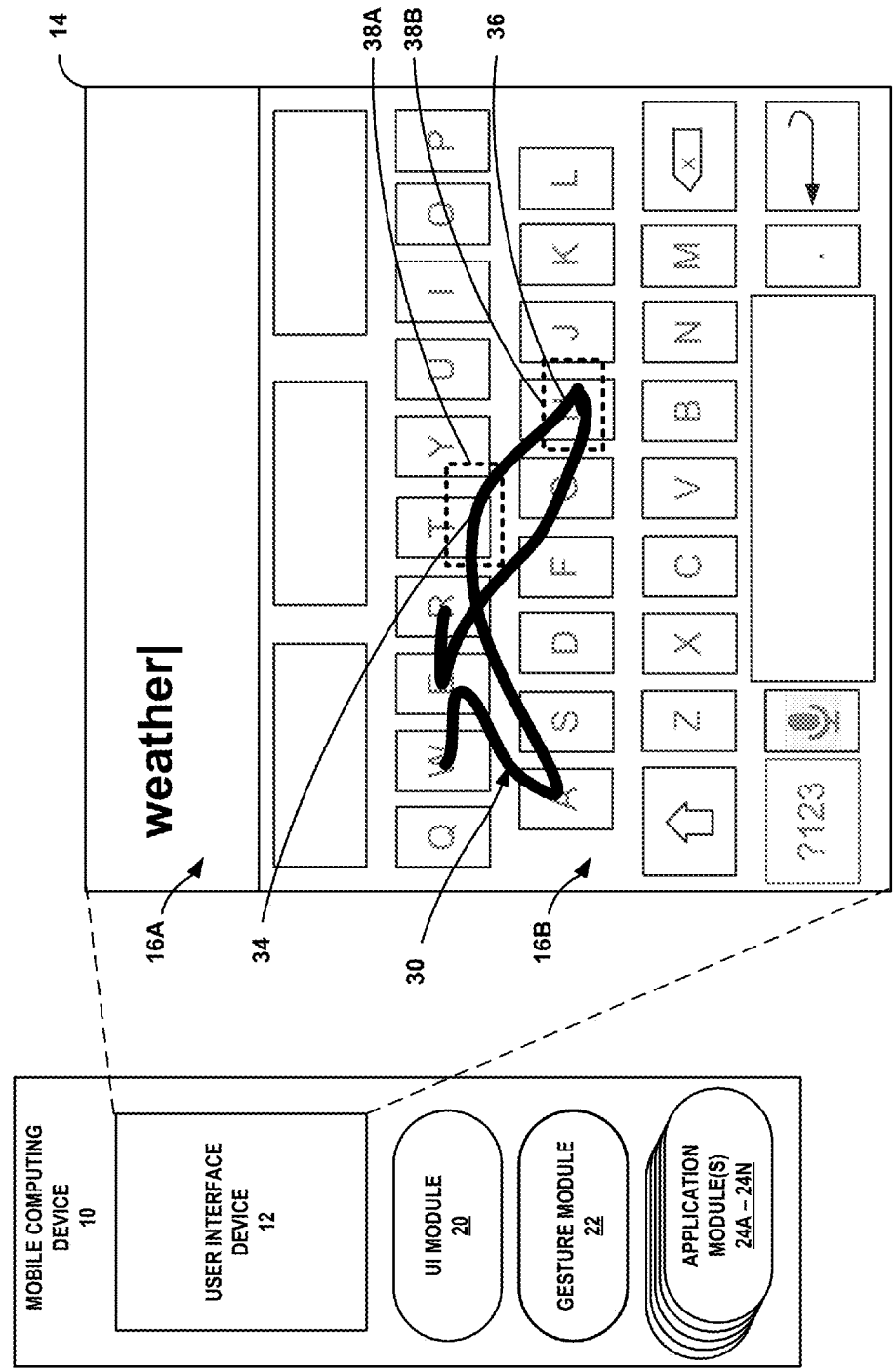
FIG. 1 is a conceptual diagram illustrating an example computing device that is configured to filter input entered at a user interface device based on the density of the input, in accordance with one or more aspects of the present disclosure.

Examples described in this disclosure relate to techniques implemented by a computing device that receives user inputs at a presence-sensitive screen. In some implementations, the computing device, in response to receiving a user input, may generate a group of gesture events associated with the input. These gesture events may, for example, include data that represents parameters (e.g., when, where, originating direction) characterizing a presence and/or movement of input at the presence-sensitive screen. In some implementations, an application executing at the computing device can then perform a function or operation based at least in part on the data represented by one or more of the gesture events. For purposes of example, gesture events are described herein in reference to touch events, though the techniques described may be applied to events generally indicative of a presence of finger or other input modality in association with a presence-sensitive display.

In accordance with techniques of the disclosure, rather than simply transmitting the group of touch events to an application, the computing device may first determine a density of the group of touch events for at least part of the user input. The density may indicate a quantity of touch events that are associated with a defined area of the presence-sensitive screen over a time duration. In this way, a larger density of touch events may indicate more collocated touch events in a defined area than a smaller density of touch events. An application executing at the computing device may process and utilize one or more touch events in the group of touch events to correctly perform a function in response to the user input. However, some touch events in a high-density portion of the user input may be redundant or otherwise provide little additional information over other touch events within the touch event group. In other words, as described herein, the computing device may correctly perform a function or other operation by selectively processing and utilizing only some of the touch events associated with a high-density portion of the user input. For example, the computing device may determine a selection of a single key of a graphical keyboard from a single touch event or a reduced number of touch events. A high-density of touch events within a region of the presence-sensitive screen associated with the same key may not be useful to determine which key the user intended to select. For example, the graphical keyboard may determine a key selection based on a single touch event or reduced number of touch events that are closest to a centroid of a key or multiple high-density touch events near a centroid of a key.

As described herein, based on the density of the user input, the computing device may modify (e.g., filter) the group of touch events. The modified (e.g., filtered) group of touch events may contain fewer touch events than the unmodified group of touch events, yet the modified group of touch events may, in any event, adequately approximate the user input entered at the presence-sensitive screen. The computing device may transmit the modified group of touch events to an application or other computing module rather than the unmodified group of touch events. For instance, the computing device may eliminate redundant touch events from the group of touch events so that a graphical keyboard application that receives the touch events only processes touch events that result in different key selections.

In this way, applications that receive the modified group of touch events may perform a function in response to a user input more efficiently than applications that receive the unmodified group of touch events. For instance, if an application performs at least one operation for each touch event, an application that receives a modified group of touch events may perform at least one fewer operation for each touch event that the computing device filters out of the group of touch events.

In addition, aspects of the disclosure may be applied to ensure that performance and behavior of an application that receives filtered touch events is independent of the presence-sensitive screen technology used to receive the user input. More specifically, presence-sensitive screens often utilize different sampling rates or offer different levels of resolution. An application executing at a computing device that uses a presence-sensitive screen with a high-frequency sampling rate and/or higher resolution may receive denser user input (and define a greater number of touch events based on the user input) than the same application executing at a different computing device that utilizes presence-sensitive screens with lower frequency sampling rates and/or lower resolutions for receiving the same user input. The techniques described herein may be applied to moderate these differences in density of touch events, thereby providing more consistent and uniform behavior of an application across disparate computing devices.

One or more of the techniques described herein may enable the computing device to determine a density associated with part of a user input and modify touch events generated from the input to eliminate redundant touch events. In this manner, an application (e.g., a graphical keyboard application) may receive modified touch events instead of the unmodified touch events. An application executing at the computing device that receives modified touch events may perform fewer operations processing the modified touch events to perform a function than an application that performs more operations processing unmodified touch events to perform the same function. By performing fewer operations, the computing device may potentially operate more efficiently and consume less electrical power. In addition, an application that receives modified touch events according to the one or more techniques described herein may exhibit the same behavior, irrespective of the presence-sensitive screen technology used to receive the input, thus allowing for enhanced portability of the application across multiple types of computing platforms that use different types of presence-sensitive screen technology.

FIG. 1 is a conceptual diagram illustrating an example computing device 10 that is configured to filter input entered at user interface device 12 (e.g., presence-sensitive screen) based on the density of the input, in accordance with one or more aspects of the present disclosure. In the example of FIG. 1, computing device 10 is a mobile phone. However, in other examples, computing device 10 may be a tablet computer, a personal digital assistant (PDA), a laptop computer, a tabletop computer, a portable gaming device, a portable media player, an e-book reader, a watch, or another type of computing device.

As shown in FIG. 1, computing device 10 includes a user interface device ("UID") 12. UID 12 of computing device 10 may function as an input device for computing device 10 and additionally, in some instances, as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

For purposes of illustration only, when describing UID 12, it is assumed in the example of FIG. 1 that UID 12 includes a presence-sensitive screen that can receive tactile user input from a user of computing device 10. UID 12 may receive the tactile user input by detecting one or more tap gestures and/or non-tap gestures from a user of computing device 10 (e.g., the user touching or pointing to one or more locations of UID 12 with a finger or a stylus pen). The presence-sensitive screen of UID 12 can also present output to a user. UID 12 may present the output as a user interface (e.g., user interface 14) which may be related to functionality provided by computing device 10. For example, UID 12 may present various functions and applications executing on computing device 10 such as a graphical keyboard, an electronic message application, and a map application.

Computing device 10 may include user interface ("UI") module 20, gesture module 22, and one or more application modules 24A-24N ("application modules 24"). Modules 20, 22, and 24 may perform operations described herein using software, hardware, firmware, or a mixture of hardware, software, and firmware residing in and executing on computing device 10. Computing device 10 may execute modules 20, 22, and 24 with one or more processors. In some examples, computing device 10 may execute modules 20, 22, and 24 as a virtual machine executing on underlying hardware.

UI module 20 may receive data from application modules 24 and process the data into a user interface (e.g., user interface 14), including graphical elements, for display at the presence-sensitive screen of UID 12. FIG. 1 illustrates UI module 20 causing UID 12 to present user interface 14 as part of a text-editing application (e.g., an electronic mail application) with edit region 16A and graphical keyboard 16B. Graphical keyboard 16B includes graphical elements displayed as keys. A selection of a key may cause computing device 10 to output for display, a character associated with the key within edit region 16A. A user of computing device 10 may enter text for display in edit region 16A by providing user input at locations of UID 12 that display the keys of graphical keyboard 16B. For example, FIG. 1 illustrates user input 30 traversing a path over a 'W' key, an 'E' key, an 'A' key, a 'T' key, an 'H' key, the 'E' key again, and an 'R' key of graphical keyboard 16B. User input 30 may cause UI module 20 to command UID 12 to output for display, the characters "w-e-a-t-h-e-r" within edit region 16A.

Although FIG. 1 illustrates user interface 14 as being a user interface of a text-editing application, in other embodiments of computing device 10, user interface 14 may represent a graphical user interface of any number of applications executing on computing device 10 that perform functions in response inputs entered at the presence-sensitive screen of UID 12. For instance, UI module 20 may cause UID 12 to present a user interface of a game application or an operating system. UI module 20 may receive data from application modules 24 and processes the data into graphical elements for display at the presence-sensitive screen of UID 12.

Each of applications modules 24 is an executable application that performs one or more specific functions for computing device 10, such as an electronic messaging application, a text editor, an Internet webpage browser, or a game application. One or more application modules 24 may independently perform various functions for computing device 10 or may operate in collaboration with other application modules 24 to perform a function. For example, application module 24A may represent a graphical keyboard application that includes data for presenting graphical keyboard 16B and processing input entered within graphical keyboard 16B. Application module 24N may represent a text-editing application that includes data for presenting edit region 16A. In performing the text edit function for computing device 10, application module 24N may call or request application module 24A to output graphical keyboard 16B and to interpret input, on behalf of application module 24N, that computing device 10 receives at graphical keyboard 16B.

In other words, application module 24A may receive data about a user input (e.g., user input 30) entered at a location of a presence-sensitive screen of UID 12 that presents graphical keyboard 16B. Based on the data about the user input, application module 24A may determine a selection of keys of graphical keyboard 16B and determine a character string based on the selection of keys. Application module 24A may output the character string to application module 24N. Application module 24N may receive the output from application module 24A and cause UI module 20 to include the character string within edit region 16A.

Gesture module 22 of computing device 10 may receive from UID 12 an indication of user input entered at the presence-sensitive screen of UID 12 and process the user input into data that gesture module 22 then shares with application modules 24. Gesture module 22 may, for example, be a component of an operating system executing on mobile computing device 10. Each time UID 12 receives an indication of user input detected at a location of the presence-sensitive screen, gesture module 22 may receive information about the user input from UID 12. Gesture module 22 may assemble the information received from UID 12 and generate an initial group of touch events. One or more touch events in the initial group may include a representation (e.g., data), such as a location associated with UID 12, a time related to when UID 12 received part of a user input at the location, and/or a direction related to whether the touch event represents a lift up, a push down, or a lateral motion at the presence-sensitive screen. Gesture module 22 may transmit the initial group of touch events to one or more of application modules 24. Application modules 24 may use the data associated with one or more of these initial touch events to determine an appropriate response to the user input. For example, based on the location components of these initial touch events, application module 24A may determine that user input 30 represents a selection of the 'W' key, the 'E' key, the 'A' key, the 'T' key, the 'H' key, the 'E' key again, and the 'R' key and in response output the characters 'w', 'e', 'a', 't', 'h', 'e', and 'r' to application module 24N.

Instead of transmitting the initial group of touch events to application modules 24, gesture module 22 may modify the group of touch events by filtering out redundant touch events associated with a high-density portion of the group of touch events. For example, as described below in further detail, gesture module 22 may determine that at least part of the group of touch events comprise a high-density portion of touch events by comparing the density of the portion to a threshold and may determine the portion represents a high-density portion if the density satisfies the threshold.

The techniques are now further described in detail with reference to FIG. 1. In the example of FIG. 1, UID 12 of computing device 10 may receive an indication of user input 30 entered at a location of a presence-sensitive screen. For example, FIG. 1 illustrates UI module 20 causing UID 12 to output user interface 14 that includes edit region 16A and graphical keyboard 16B. A user may enter user input 30 by dragging a finger over locations of the presence-sensitive screen of UID 12 that presents the keys of graphical keyboard 16B. FIG. 1 illustrates the path over the presence-sensitive screen that the finger of the user traverses when the user enters user input 30. Regions 38A and 38B of FIG. 1 bound portions of the path associated with user input 30. The portion of user input 30 bounded by region 38A represents segment 34 and the portion of user input 30 bounded by region 38B represents inflection point 36. Although illustrated as a single gesture, user input 30 may comprise one or more tap gestures and/or one or more non-tap gestures. For instance, user input 30 may include breaks (e.g., where the finger of the user lifts up from the presence-sensitive screen and presses down again at the presence-sensitive screen).

Whether user input 30 represents a single non-tap gesture, a single tap gesture, or a combination of one or more tap and non-tap gestures, in response to the indication of user input 30, gesture module 22 may receive information from UID 12 about user input 30. Gesture module 22 may assemble the information about user input 30 and generate a group of touch events based at least in part on the indication. For example, UID 12 may overlay a virtual grid of coordinates onto the presence-sensitive screen of UID 12. The grid may not be visibly displayed by UID 12. The grid may assign a coordinate that includes a horizontal component (X) and a vertical component (Y) to each location. Each time UID 12 detects user input entered at the presence-sensitive screen of UID 12, gesture module 22 may receive information from UID 12. The information may include one or more coordinate locations and associated times indicating to gesture module 22 both where UID 12 detects user input at the presence-sensitive screen of UID 12 and when UID 12 detects user input. The information may further include one or more directions that represent whether part of a user input represents a lift up, a push down, or a lateral motion over the presence-sensitive screen of UID 12.

Gesture module 22 may assemble the information about user input 30 received from UID 12, to generate a group of touch events based on the indication of the user input. One or more touch events in the group of touch events may represent part or all of user input 30. Touch events in the group may include a representation of a location (e.g., the coordinate location) of part of user input 30, a time associated with part of user input 30, and/or a direction associated with part of user input 30. Gesture module 22 may modify the group of touch events to filter out redundant touch events and reduce the number of touch events that one or more application modules 24 may process.

To determine whether and how to modify the group of touch events, gesture module 22 may determine, based at least in part on the group of touch events, a density of a portion of the group of touch events. The density may indicate a quantity of touch events associated with a region of the presence-sensitive screen over a time duration. In other words, the density of a group of touch events may represent a ratio between a quantity of touch events associated with a bounded physical area (e.g., region) of the presence-sensitive screen of UID 12, where the touch events are sequence within a temporal order or otherwise occur within a defined time duration, such as a within a few or tens of milliseconds of each other. Gesture module 22 may utilize a region of the presence-sensitive screen independent of the features of user interface 14 or based the region on the features of user interface 14. For instance, gesture module 22 may determine the density based on a region of the presence-sensitive screen that represents a key of graphical keyboard 16B.

For example, to determine the density of the touch events associated with segment 34 of user input 30, gesture module 22 may determine a ratio between the quantity of touch events associated with segment 34 and a physical area of the presence-sensitive screen of UID 12 (e.g., region 38A) that bounds segment 34. Gesture module 22 may determine a time-ordered sequence of touch events that includes one or more touch events associated with segment 34. Gesture module 22 may determine a quantity of touch events in the sequence of touch events. Based on the locations of one or more touch events in the sequence, gesture module 22 may determine a minimum area A (e.g., A square pixels, A square inches, etc. within region 38A) that bounds the locations of one or more touch events in the sequence. For instance, the area A of region 38A may correspond to a rectangular area of a the presence-sensitive screen of UID 12 with vertical edges at the maximum and minimum x coordinate locations of the touch events in the sequence and horizontal edges at the maximum and minimum y coordinate locations of the touch events in the sequence. Gesture module 22 may determine that the density of the touch events associated with segment 34 comprises a ratio between the quantity of touch events in the sequence and the area A (e.g., number of touch events within region 38A divided by area A of region 38A). To determine the density of the touch events associated with inflection point 36, gesture module 22 may similarly determine a ratio between the quantity of touch events associated with inflection point 36 and the physical area of the presence-sensitive screen of UID 12 (e.g., region 38B) that bounds inflection point 36.

Gesture module 22 may compare both the density of segment 34 and the density of inflection point 36 to a threshold density. In one example, the threshold density may represent a predefined optimal density required by application modules 24 for adequately performing a function. Application modules 24 may perform the same function using a higher density group of touch events as a group of touch events with the optimal density. However in processing the group of touch events with the higher density, application modules 24 may perform more operations than application modules 24 perform in processing an optimal density group of touch events. Gesture module 22 may compare the density of inflection point 36 and segment 34 to the threshold density. Gesture module 22 may determine the density of inflection point 36 exceeds, and therefore satisfies the threshold density, and may determine the density of segment 34 does not exceed, and therefore does not satisfy the threshold density.

In response to determining that the density satisfies a threshold, gesture module 22 may modify the group of touch events. In one example, in response to determining the density satisfies the threshold, gesture module 22 may remove one or more touch events from the group. For instance, gesture module 22 may remove one or more touch events associated with inflection point 36 until the density associated with inflection point 36 and approximately equals the optimal density defined by the threshold. In a second embodiment, in response to determining the density satisfies the threshold, gesture module 22 may combine two or more touch events into a single touch event in the group. For example, instead of removing touch events from the group, gesture module 22 may combine (e.g., average) data of two or more touch events in the group and replace the two or more touch with a single touch event until the density of the group of touch events associated with inflection point 36 satisfies the threshold.

Gesture module 22 may output the modified group of gesture events to an application, such as one of application modules 24. For instance, gesture module 22 may output the modified group of gesture events to a gesture graphical keyboard application such as application module 24A. Application modules 24 that receive the modified group of touch events from gesture module 22 may more efficiently perform a function, such as determining a selection of one or more keys of graphical keyboard 16B. In this manner, application modules 24 executing at computing device 10 that receive touch events from gesture module 22 may potentially perform fewer operations unnecessarily processing redundant touch events. Consequently, by application modules 24 performing fewer operations, computing device 10 may potentially operate more efficiently and consume less electrical power than other computing devices.

Figure 2:
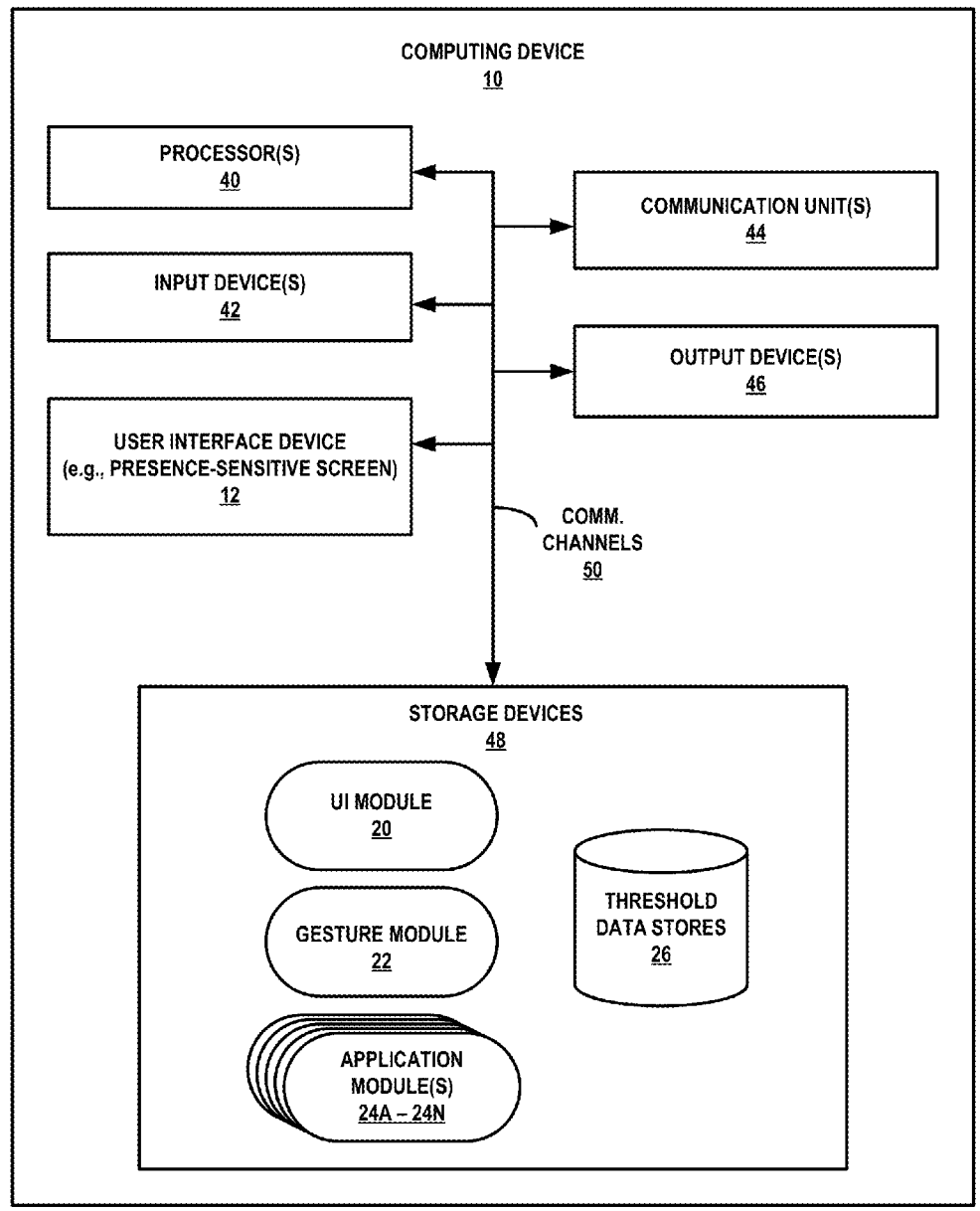
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2. Although shown in FIGS. 1 and 2 as a stand-alone computing device for purposes of example, computing device 2 may be any component or system that includes one or more processors (e.g., one or more processors 40) or other suitable computing environment for executing software instructions and, for example, need not necessarily include one or more of the elements shown in these figures (e.g., UI device 12, input devices 42, output devices 46).

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, gesture module 22, application modules 24A-24N (collectively referred to as "application modules 24"), and threshold data stores 26. Communication channels 50 may interconnect one or more of the components 12, 20, 22, 24, 26, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive screen. In some examples, a presence-sensitive screen may detect an object at and/or near the presence-sensitive screen. As one example range, a presence-sensitive screen may detect an object, such as a finger or stylus that is within two inches or less of the presence-sensitive screen. The presence-sensitive screen may determine a location (e.g., an (x,y) coordinate) of the presence-sensitive screen at which the object was detected. In another example range, a presence-sensitive screen may detect an object six inches or less from the presence-sensitive screen and other example ranges are also possible. The presence-sensitive screen may determine the location of the screen selected by a user's finger using capacitive, inductive, and/or optical recognition techniques. In some examples, presence-sensitive screen provides output to a user using tactile, audio, or video stimuli as described with respect to output device 46. In the example of FIG. 2, UID 12 presents a user interface (such as user interface 14 of FIG. 1), and other various functions and applications executing on computing device 10 at the presence-sensitive screen of UID 12.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor or a projector that shares a wired and/or wireless data path with a tablet computer).

One or more storage devices 48 within computing device 10 may store information for processing during operation of computing device 10 (e.g., threshold data stores 26 of computing device 10 may store data related to one or thresholds, such as one or more distance thresholds and one or more speed thresholds, accessed by gesture module 22 during execution on computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, gesture module 22, application modules 24, and threshold data stores 26.

One or more processors 40 may implement functionality and/or execute instructions within computing device 10. For example, processors 40 on computing device 10 may receive and execute instructions stored by storage devices 48 that execute the functionality of UI module 20, gesture module 22, and application modules 24. These instructions executed by processors 40 may cause computing device 10 to store information, within storage devices 48 during program execution. Processors 40 may execute instructions of modules 20-24 to cause UID 12 to display user interface 14 with edit region 16A and graphical keyboard 16B at the presence-sensitive screen of UID 12. That is, modules 20-24 may be operable by processors 40 to perform various actions, including receiving user input entered at locations of the presence-sensitive screen of UID 12 and causing UID 12 to present user interface 14 at the presence-sensitive screen of UID 12.

In accordance with aspects of this disclosure computing device 10 of FIG. 2 may receive an indication of a user input entered at a location of a presence-sensitive screen. For example, UI module 20 may transmit data over communication channels 50 to UID 12 that causes UID 12 to output user interface 14 of FIG. 1, including edit region 16A and graphical keyboard 16B. UI module 20 may generate the data transmitted to UID 12 based on information received from application modules 24. For instance, application module 24A may be a gesture graphical keyboard application that controls the layout of graphical keyboard 16B and interprets input entered at graphical keyboard 16B as a selection of one or more keys. Application module 24A may generate characters based on a selection of the one or more keys and transmit data representative of the characters to UI module 20 or other application modules 24 (e.g., for inclusion within edit region 16A).

A user may enter user input 30 by gesturing over a location of the presence-sensitive screen of UID 12 that presents the keys of graphical keyboard 16B. As illustrated within FIG. 1, the user may gesture continuously at segment 34 and change directions to induce inflection point 36. UID 12 may receive an indication of user input 30 when the user enters user input 30 at the presence-sensitive screen.

Computing device 10 may generate, based at least in part on the indication, a group of gesture events (e.g., touch events). For example, after receiving the indication of user input 30, UID 12 may transmit information about user input 30 over communication channels 50 to gesture module 22. Gesture module 22 may receive the information from UID 12 and generate a group of touch events based on the information. At least one touch event in the group of touch events may include a representation of a direction (e.g., a direction component), a location (e.g., a location component), and/or a time (e.g., a time component). In other words, touch events may include data that represents from what direction UID 12 received part or all of user input 30 at the presence-sensitive screen of UID 12, where at the presence-sensitive screen UID 12 received part or all of user input 30, and when UID 12 received part or all of user input 30 at the presence-sensitive screen of UID 12.

Computing device 10 may determine, based at least in part on the group of touch events, a density of a portion of the group of touch events. The density may indicate a quantity of touch events associated with a region of the presence-sensitive screen of UID 12 over a time duration. For example, gesture module 22 may isolate a sequence of touch events from the group of touch events generated from user input 30. The sequence of touch events may correspond to the touch events associated with inflection point 36 of user input 30. To determine the density of the sequence of touch events associated with inflection point 36, gesture module 22 may determine a quantity of the touch events in the sequence and determine a ratio between the quantity and an area that bounds the locations of the touch events in the sequence of touch events. In one example, the area may correspond to an area of a region of the presence-sensitive screen of UID 12 (e.g., region 38A) that encompasses locations of touch events in the sequence.

In response to determining that the density satisfies a threshold computing device 10 may modify, based at least in part on the density, the group of touch events. For example, gesture module 22 may act as an intermediary to filter input received by computing device 10 at the presence-sensitive screen of UID 12. Rather than pass an unmodified group of touch events to UI module 20 or applications 24, gesture module 22 may modify the group of touch events based on the density of the touch events. In other words, gesture module 22 may modify the group of touch events to contain fewer touch events when the group of touch events includes redundant touch events that do not alter or improve an interpretation of the group of touch events by UI module 20 or application modules 24. As such, the modified group of touch events may reduce operations performed by UI module 20 or application modules 24 processing extra touch events.

In the example of FIG. 2, to determine an appropriate modification to the group of touch events, gesture module 22 may compare the density of a portion of the group of touch events (e.g., inflection point 36) to a threshold. The threshold may represent a predefined optimal touch event density defined by one of application modules 24 that receive and process touch events. For instance, threshold data stores 26 may contain one or more density thresholds that gesture module 22 may retrieve and compare against calculated densities of user inputs entered at the presence-sensitive screen of UID 12. The one or more thresholds within threshold data stores 26 may contain data predetermined by application modules 24. Graphical keyboard application module 24A may determine, and store within threshold data stored 26, a minimum touch event density needed to accurately determine a selection of keys of graphical keyboard 16B. Graphical keyboard application module 24A may likewise determine and store an optimal touch event density to accurately determine a selection of keys of graphical keyboard 16B.

Gesture module 22 may retrieve from threshold data stores 26 a threshold to compare against the density of the touch events associated with inflection point 36. Gesture module 22 may determine whether the density exceeds the threshold. If the density does exceed the threshold, gesture module 22 may determine the density of the touch events associated with inflection point 36 represents a high degree of density and that filtering one or more touch events may result in improved performance by one or more of application modules 24 that receive the filtered or modified touch events rather than unmodified touch events.

In some examples, gesture module 22 may remove touch events from the group of touch events to generate a group of touch events having a density that does not satisfy the threshold density. In other words, in response to removing at least one touch event from the sequence of touch events, gesture module 22 may determine that a second density of the at least part of the group of touch events comprises a ratio between a second quantity of touch events in sequence of touch events and a second area that bounds the locations of the touch events in the sequence of touch events. For example, gesture module 22 may remove one or more touch events from the sequence of touch events that define inflection point 36. After removing the one or more touch events, gesture module 22 may calculate an updated (e.g., second) density of the sequence of touch events and compare the updated density to a threshold. In response to determining the second density satisfies the threshold, gesture module 22 may remove at least one touch event from the group of touch events that corresponds to the at least one touch event removed from the sequence. For example, if the second density associated with the sequence of motion events no longer exceeds the threshold, gesture module 22 may likewise remove the touch events from the group that correspond to the touch events removed from the sequence.

In some examples, gesture module 22 may combine touch events within the group of touch events into a single touch event in the group to generate a group of touch events having a density that does not satisfy the threshold density. In other words, in response to combining at least two touch events in the sequence of touch events into a single touch event, gesture module 22 may determine that a second density of the at least part of the group of touch events comprises a ratio between a second quantity of touch events in sequence of touch events and a second area that bounds the locations of the touch events in the sequence of touch events. For example, rather than remove touch events from the sequence as described above, gesture module 22 may combine locations and times of two or more consecutive touch events in the sequence and replace the two or more consecutive touch events with a single touch event having the combined location and time. In some examples, gesture module 22 may average the locations and times of two or more touch events. In other examples, gesture module 22 may choose a one of the locations and average the times of two or more touch events. The group of touch events may represent a modified group of touch events suitable for transmitting over communication channels 50 to application modules 24 or UI module 20.

In any event, after combining two or more touch events in the sequence, gesture module 22 may again calculate the density of the sequence and compare the density to the threshold. In response to determining the second density satisfies the threshold, gesture module 22 may combine at least two touch events in the group of touch events into a single touch event. The at least two touch events in the group of touch events may correspond to the at least two touch events in the sequence combined into the single touch event. In other words, after determining a combination of touch events in the sequence that reduces the density of the sequence below the threshold, gesture module 22 may similarly combine two or more corresponding touch events in the group. The group of touch events may represent a modified group of touch events suitable for transmitting over communication channels 50 to application modules 24 or UI module 20.

Gesture module 22 may output the modified group of gesture events to an application. The application may be a gesture graphical keyboard application. For instance, gesture module 22 may transmit the modified group of touch events over communication channels 50 to application module 24A (e.g., a graphical keyboard application) for efficient decoding of user input 30 into a selection of multiple keys of graphical keyboard 16B.

In some examples, the modified group of touch events may comprise a first quantity of touch events that that is less than a second quantity of the group of gesture events for determining a selection of one or more keys of a graphical keyboard based on the user input. For instance, the modified group of touch events may include only a portion or subset of the original group of touch events generated by gesture module 22 from user input 30. The portion may include a first (e.g., a minimum) quantity of touch events that reduce processing and operations performed by application module 24A. In some instances, the minimum quantity of touch events needed for application module 24A to function properly may be one touch event for each key selection. Touch events in the modified group of touch events may correspond to a different key selection. For example, after receiving the indication of user input 30, the modified group of touch events may include seven touch events, one touch event corresponding to the 'W' key of graphical keyboard 16B, one touch event corresponding to the 'E' key of graphical keyboard 16B, one touch event corresponding to the 'A' key of graphical keyboard 16B, one touch event corresponding to the 'T' key of graphical keyboard 16B, one touch event corresponding to the 'H' key of graphical keyboard 16B, a second touch event corresponding to the 'E' key of graphical keyboard 16B, and one touch event corresponding to the 'R' key of graphical keyboard 16B.

Figure 3A:
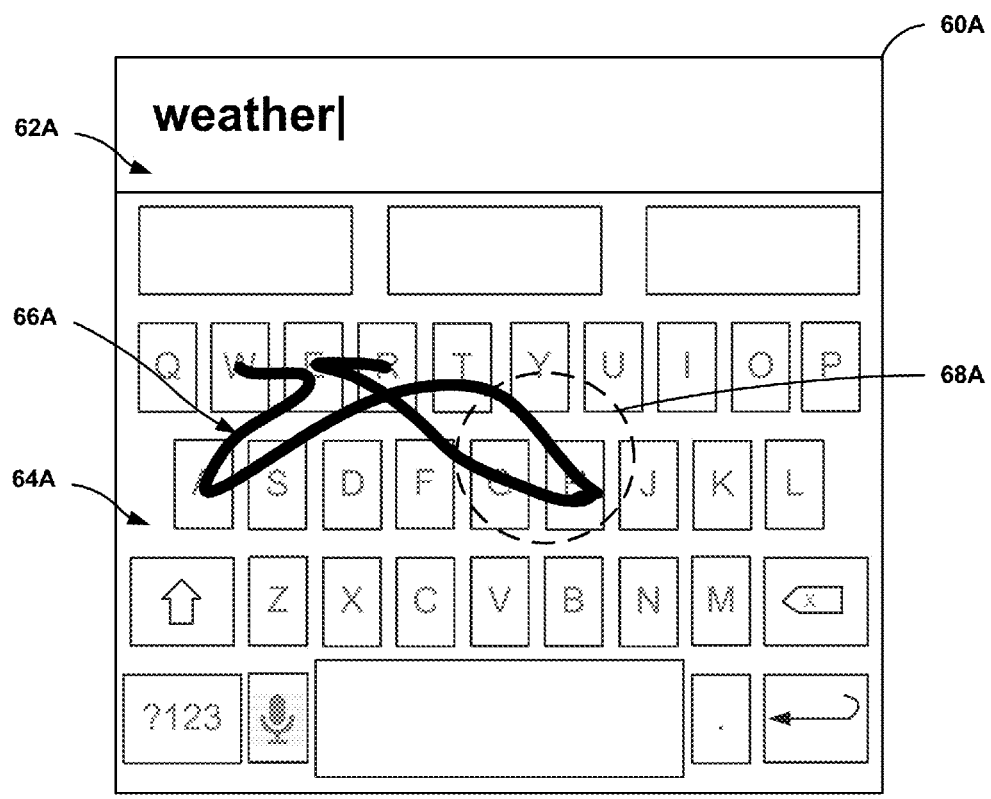
FIGS. 3A-3C are conceptual diagrams illustrating example user inputs entered at a user interface device of a computing device that is configured to filter input based on the density of the input, in accordance with one or more aspects of the present disclosure.
Figure 3B:
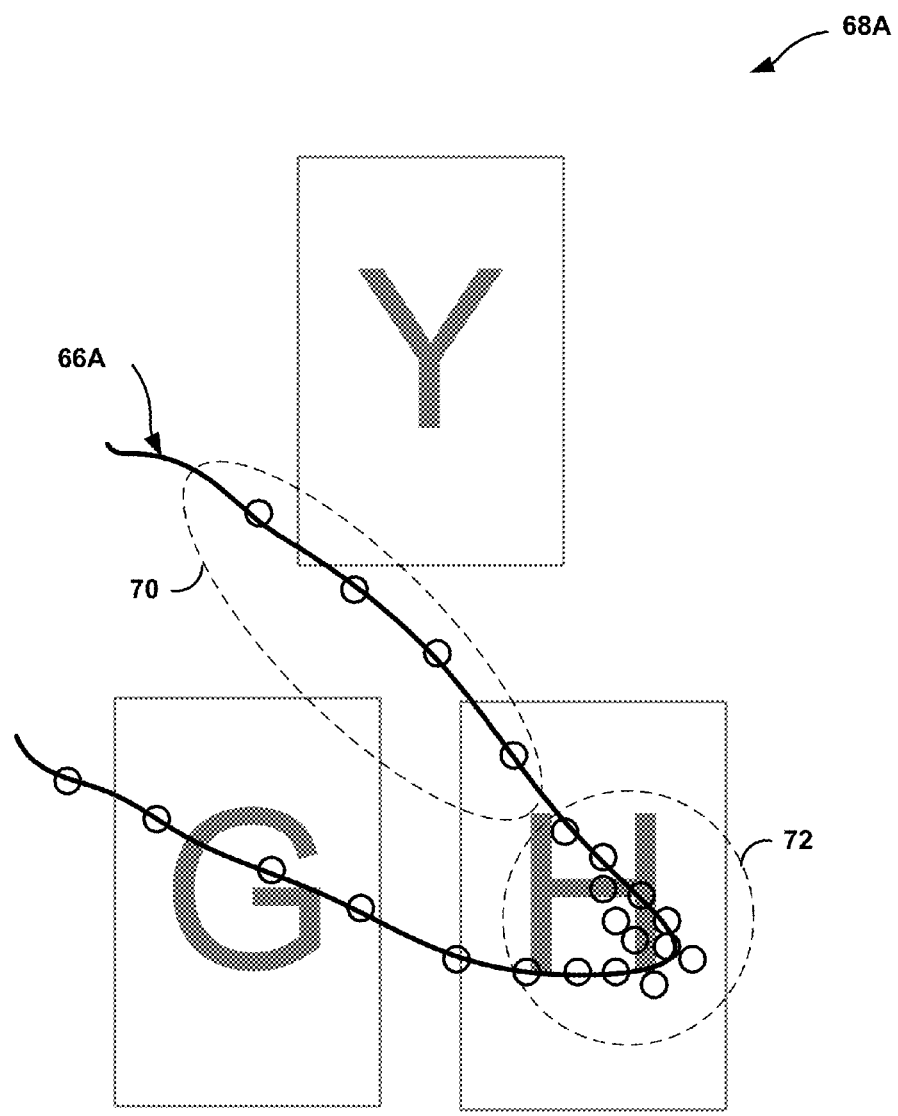
Figure 3C:
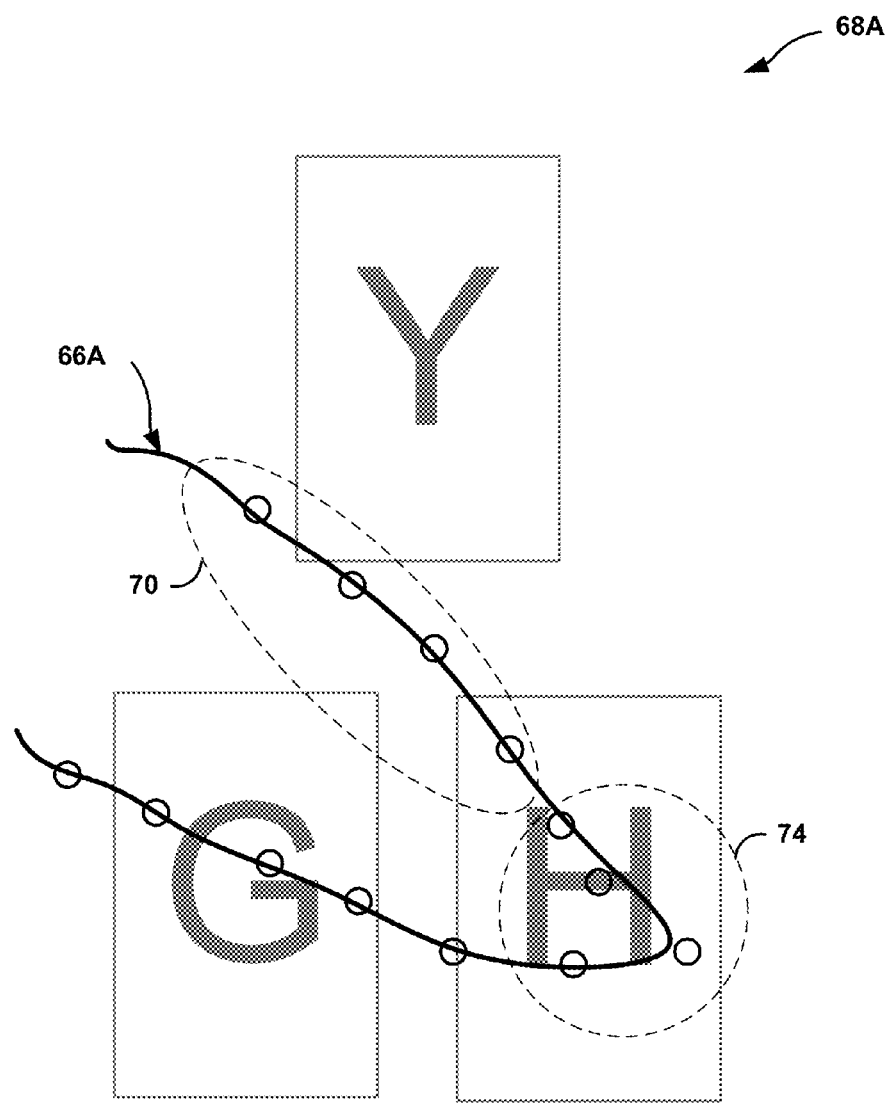

FIGS. 3A-3C are conceptual diagrams illustrating example user inputs entered at a user interface device (e.g., presence-sensitive screen) of a computing device that is configured to filter input based on the density of the input, in accordance with one or more aspects of the present disclosure. FIGS. 3A-3C are described below in the context of computing device 10 (described above) from FIG. 1 and FIG. 2. For purposes of illustration only, it is assumed that UID 12 includes a presence-sensitive screen.

In the example of FIG. 3A, computing device 10 may output graphical user interface 60A at the presence-sensitive screen of UID 12. FIG. 3A illustrates user interface 60A including edit region 62A and graphical keyboard 64A. Graphical keyboard 64A includes a number of keys. A user may enter user input 66A at a location of the presence-sensitive screen of UID 12 where UID 12 presents graphical keyboard 64A. Region 68A illustrates an inflection point of user input 66A where user input 66A changes direction over a key of graphical keyboard 64A. Gesture module 22 may receive information about user input 66A from UID 12 and generate a group of touch events based on the information. Gesture module 22 may modify the group of touch events in response to determining a density associated with at least part of user input 66A. The description of FIGS. 3B and 3C illustrate exploded views of region 68A and describe in greater detail operations performed by computing device 10 in response to the inflection point within region 68A.

FIG. 3B illustrates an exploded view of region 68A from FIG. 3A. As described above, gesture module 22 may receive information about user input 66A from UID 12 and generate a group of touch events based on the information. Gesture module 22 may modify the group of touch events in response to determining a density associated with at least part of user input 66A.

For example, gesture module 22 may determine a density of a sequence of touch events out of the group of touch events to isolate a high-density part of user input 66A. FIG. 3B illustrates touch events associated with sequence 70 and other touch events associated with sequence 72. Sequence 70 represents touch events that correspond to a segment of user input 66A and sequence 72 represents touch events that correspond to an inflection point of user input 66A. Using the techniques described above with respect to FIGS. 1 and 2, gesture module 22 may determine the density of sequence 70 does not exceed a threshold and as a result, not modify the touch events in the group of touch events that correspond to the touch events in sequence 70. Gesture module 22 may determine the density of sequence 72 does exceed the threshold and as a result modify the touch events in the group of touch events that correspond to the touch events in sequence 72.

The threshold used by gesture module 22 to compare with a density of part of user input 66A may be a predefined threshold or in some instances, may be based on the density of touch events generated from a different part of user input 66A. Application modules 24 that receive the group of touch events from gesture module 22 may operate more efficiently if the density of user input 66A is uniform. In other words, the at least part of the group of touch events (e.g., sequence 72) may correspond to touch events based on a second part of the user input (e.g., user input 66A). The threshold may correspond to a density of touch events based on a first part of the user input (e.g., sequence 70) different from the second part of the user input (e.g., sequence 72). For example, gesture module 22 may determine the density of the touch events associated with sequence 70. In comparing the density of sequence 72 to a threshold, gesture module 22 may actually compare the density of sequence 72 to the density of sequence 70. Gesture module 22 may determine the density of sequence 72 satisfies the threshold if the density of sequence 72 exceeds the density of sequence 70.

Gesture module 22 may modify or filter the group of touch events in response to determining the density associated with sequence 72 in a variety of ways. For example, gesture module 22 may selectively remove or combine touch events until the density of the touch events associated with sequence 72 does not exceed the threshold.

In other examples, gesture module 22 may determine a mean gesture event from the portion of the group of gesture events and replace at least one gesture event from the group of gesture events with the mean gesture event. In other words, gesture module 22 may determine a single centroid of sequence 72 by averaging all the locations within sequence 72. Gesture module 22 may replace the touch events in the group that correspond to the touch events of sequence 72 with the single centroid touch event. In still other examples, instead of replacing all the touch events of sequence 72 with just the single centroid touch event, gesture module 22 may retain the touch events in the group that have locations furthest from the location of the centroid touch event. In other words, the modified sequence of touch events may include a mean gesture event and one or more outer boundary touch events furthest from the mean but within an area for determining density.

In still other examples, gesture module 22 may determine, based on the location of one or more gesture events in the portion of the group of gesture events, at least one of a best fit linear and polynomial representation of locations of the presence-sensitive screen. In other words, gesture module 22 may determine a best fit linear and/or polynomial representation of the locations of sequence 72. Gesture module 22 may determine, based on the best fit linear and/or polynomial representation, one or more outlier gesture events in the portion of the group of gesture events and removing the one or more outlier gesture events from the group of gesture events. For instance, gesture module 22 may replace the touch events in the group that correspond to the touch events of sequence 72 with a minimum quantity of touch events that have a density less than the threshold and also have locations along the linear or polynomial representation.

In other examples, gesture module 22 may identify a Kalman filter estimation of the portion of the group of gesture events. Gesture module 22 may determine, based on Kalman filter estimation, one or more outlier gesture events in the portion of the group of gesture events and remove the one or more outlier gesture events from the group of gesture events. In other words, gesture module 22 may utilize a Kalman filter or other type of filter known in the art to identify a subset of touch events in sequence 72 that most accurately represent user input 66A. Gesture module 22 may remove touch events from the group of touch events that correspond to those touch events not included in the subset.

FIG. 3C also illustrates an exploded view of region 68A from FIG. 3A. FIG. 3C illustrates the modified touch events generated from user input 66A if the touch events were displayed on the presence-sensitive screen of UID 12. FIG. 3C illustrates an example of gesture module 22 selectively removing touch events from the group until the density of the touch events previously associated with sequence 72 of FIG. 3B have a density illustrated by sequence 74 of FIG. 3C.

Figure 4:
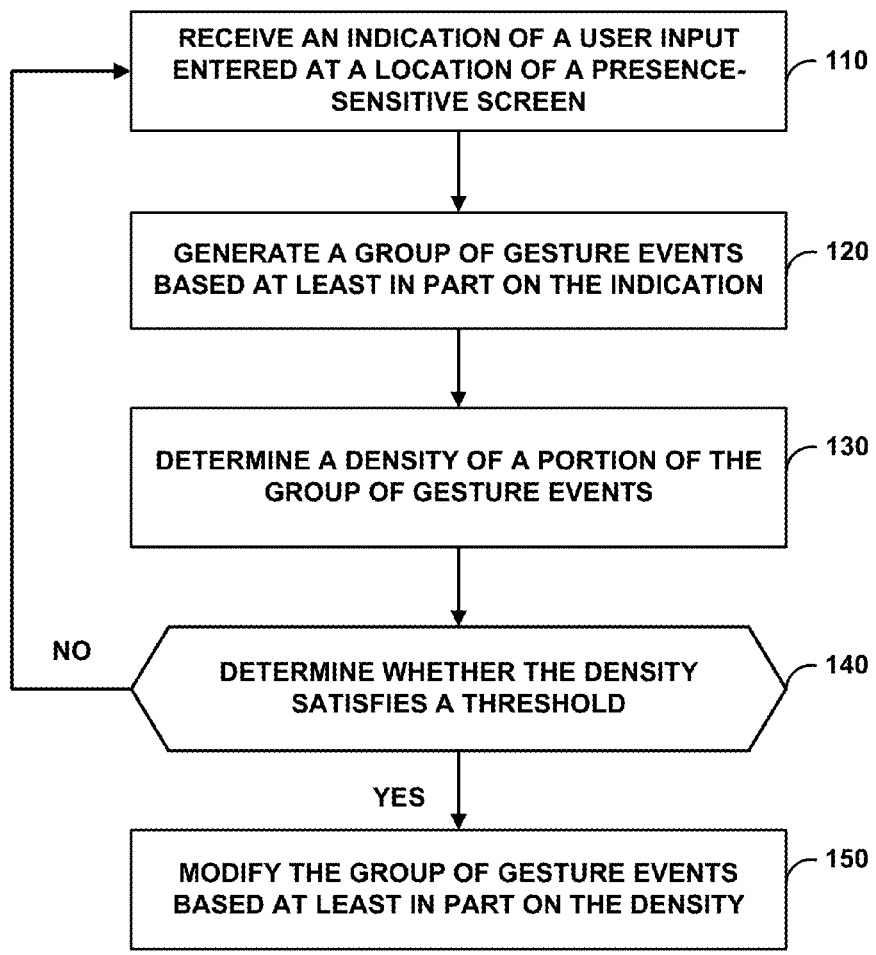
FIG. 4 is a flowchart illustrating example operations of a computing device, in accordance with one or more aspects of the present disclosure.

FIG. 4 is a flowchart illustrating example operations of a computing device, in accordance with one or more aspects of the present disclosure. The process of FIG. 4 may be performed by one or more processors of a computing device, such as computing device 10 illustrated in FIG. 1 and FIG. 2. For purposes of illustration only, FIG. 4 is described below within the context of computing devices 10 of FIG. 1 and FIG. 2.

In the example of FIG. 4, computing device 10 may receive an indication of a user input entered at a location of a presence-sensitive screen (110). For example, computing device 10 may receive an indication of user input 30 entered at a location of the presence-sensitive screen of UID 12 where UID 12 presents graphical keyboard 16B. Computing device 10 may generate data representing a group of gesture events based at least in part on the indication (120). For example, gesture module 22 of computing device 10 may receive information about user input 30 from UID 12 and generate a group of gesture events, each of the gesture events being a data object specifying information about part of user input 30, such as a location, a time, and a direction.

FIG. 4 further illustrates that computing device 10 may determine a density of a portion of the group of gesture events (130). For example, gesture module 22 may determine a subset of the group of gesture events with locations within a particular region of the presence-sensitive screen of UID 12. Gesture module 22 may determine the density of the subset comprises a ratio of the quantity of gesture events in the subset to the area of the region.

In the example of FIG. 4, computing device 10 may determine whether the density satisfies a threshold (140). In other words, gesture module 22 may compare the density of the subset of gesture events to a threshold. If the density satisfies (e.g., exceeds) the threshold, gesture module 22 may determine an appropriate modification to the subset of gesture events to reduce the density below the threshold. If the density does not satisfy the threshold, gesture module 22 may not modify the subset of gesture events.

FIG. 4 further illustrates that computing device 10 may modify the group of gesture events based at least in part on the density (150). For example, gesture module 22 may add, remove, or combine one or more gesture events in the group of gesture events that correspond to the gesture events in the subset. Gesture module 22 may remove gesture events from the group to reduce the density of the group of gesture events and to reduce redundant gesture events received and processed by one or more applications 24.

In some examples, at least one of the gesture events in the group of gesture events may comprise a representation of a location. Determining by computing device 10 the density of the portion of the group of gesture may further comprise determining, by computing device 10 and based at least in part on the portion of the group of gesture events, a sequence of gesture events. Determining by computing device 10 the density of the portion of the group of gesture events may further comprise determining, by computing device 10, that the density of the portion of the group of gesture events comprises a ratio between a quantity of gesture events in the sequence of gesture events and an area that bounds the locations of the gesture events in the sequence of gesture events.

In some examples, the density may be a first density, the quantity may be a first quantity, and the area may be a first area. Modifying the group of gesture events by computing device 10 may further comprise, in response to removing at least one gesture event from the sequence of gesture events, determining, by computing device 10, that a second density of the portion of the group of gesture events comprises a ratio between a second quantity of gesture events in sequence of gesture events and a second area that bounds the locations of the gesture events in the sequence of gesture events. Modifying the group of gesture events by computing device 10 may further comprise, in response to determining the second density satisfies the threshold, removing, by computing device 10, at least one gesture event from the group of gesture events associated with the at least one gesture event removed from the sequence.

In some examples, the density may be a first density, the quantity may be a first quantity, and the area may be a first area. Modifying the group of gesture events by computing device 10 may further comprise, in response to combining at least two gesture events in the sequence of gesture events into a single gesture event, determining, by computing device 10, that a second density of the portion of the group of gesture events comprises a ratio between a second quantity of gesture events in sequence of gesture events and a second area that bounds the locations of the gesture events in the sequence of gesture events. Modifying the group of gesture events by computing device 10 may further comprise, in response to determining the second density satisfies the threshold, replacing, by computing device 10, at least two gesture events in the group of gesture events with the single gesture event, wherein the at least two gesture events in the group of gesture events are associated with the at least two gesture events in the sequence combined into the single gesture event.

In some examples, computing device 10 may output for display at presence-sensitive screen 12, a graphical keyboard. The location at presence-sensitive screen 12 at which the indication may be entered may be included in the graphical keyboard. In some examples, computing device 10 may output for display at presence-sensitive screen 12, a gesture graphical keyboard. The indication of the user input may comprise a gesture input for selecting a plurality of keys within the gesture graphical keyboard. In some examples, the threshold may comprise a predefined optimal density value.

In some examples, the portion of the group of gesture events may comprise gesture events based on a second portion of the user input. The threshold may indicate a density of gesture events based on a first portion of the user input different from the second portion of the user input.

In some examples, the gesture events may be touch events associated with a region of a touch-sensitive display. In some examples, computing device 10 may output the modified group of gesture events to an application. In some examples, the application is a gesture graphical keyboard application.

In some examples, modifying the group of gesture events by computing device 10 may comprise determining, by computing device 10, a mean gesture event from the portion of the group of gesture events. Modifying the group of gesture events by computing device 10 may further comprise replacing, by computing device 10, at least one of the portion of the group of gesture events with the mean gesture event.

In some examples, each of the gesture events in the group of gesture events may comprise a representation of a location. Modifying the group of gesture events by computing device 10 may further comprise determining, by computing device 10 and based on the location of each gesture event in the portion of the group of gesture events, at least one of a best fit linear and polynomial representation of locations of the presence-sensitive screen. Modifying the group of gesture events by computing device 10 may further comprise determining, by computing device 10 and based on the at least one of the best fit linear and polynomial representation, one or more outlier gesture events in the portion of the group of gesture events. Modifying the group of gesture events by computing device 10 may further comprise removing, by computing device 10, the one or more outlier gesture events from the group of gesture events.

In some examples, modifying the group of gesture events by computing device 10 may further comprise identifying, by computing device 10, a filter estimation of the portion of the group of gesture events. Modifying the group of gesture events by computing device 10 may further comprise determining, by computing device 10 and based on the filter estimation, at least one outlier gesture event in the portion of the group of gesture events. Modifying the group of gesture events by computing device 10 may further comprise removing, by computing device 10, the at least one outlier gesture event from the group of gesture events.

In some examples, the user input may comprise at least one of one or more tap gestures and one or more non-tap gestures. In some examples, the modified group of touch events may comprise a first quantity of touch events that that may be less than a second quantity of the group of gesture events and computing device 10 may determine a selection of one or more keys of a graphical keyboard based on the user input.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware, software, and/or computing modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device, a group of gesture events based on an input entered at a graphical keyboard, wherein at least two gesture events in the group of gesture events comprise representations of one or more locations of the graphical keyboard;
determining, by the computing device, a density of a portion of the group of gesture events if at least one gesture event is removed from the portion of the group of gesture events, wherein the density indicates a quantity of gesture events associated with an area of the graphical keyboard in which locations of the gesture events in the portion of the group of gesture events, if the at least one gesture event is removed, are located; and
responsive to determining that the density satisfies a threshold, removing, by the computing device, the at least one gesture event from the group of gesture events to reduce the density of the portion of the group of gesture events.

2. The method of claim 1, wherein the quantity is a particular quantity, and wherein the method further comprises reducing, by the computing device, a total quantity of gesture events in the group of gesture events.

3. The method of claim 1, wherein the density is an initial density, the quantity is an initial quantity, the area is an initial area, and the method further comprises:
determining, by the computing device, a subsequent density of the portion of the group of gesture events after representing at least two gesture events in the portion of the group of gesture events into a single gesture event in the portion of the group of gesture events, wherein the subsequent density is based on a subsequent quantity of gesture events in the portion of the group of gesture events, after the at least two gesture events of the portion of the group of gesture events are represented as the single gesture event in the portion of the group of gesture events; and
responsive to determining the subsequent density satisfies the threshold, replacing, by the computing device, the at least two gesture events in the portion of the group of gesture events with the single gesture event in the portion of the group of gesture events.

4. The method of claim 1, further comprising:
prior to receiving the group of gesture events based on the input entered at the graphical keyboard, outputting, by the computing device, for display, the graphical keyboard.

5. The method of claim 1, wherein the input comprises a gesture input that indicates a plurality of keys associated with the graphical keyboard.

6. The method of claim 1, wherein the threshold comprises a predefined density value.

7. The method of claim 1, wherein the density is a subsequent density, wherein the portion of the group of gesture events comprises gesture events based on a subsequent portion of the input, and wherein the threshold indicates an initial density of gesture events based on an initial portion of the user input different from the subsequent portion of the input.

8. The method of claim 1, wherein the gesture events are touch events associated with a region of a presence-sensitive display.

9. The method of claim 1, further comprising:
subsequent to removing the group of gesture events to reduce the density of the portion of the group of gesture events, outputting, by the computing device, for transmission to an application associated with the graphical keyboard, the modified group of gesture events.

10. The method of claim 1, the method further comprises:
determining, by the computing device, a mean gesture event from the portion of the group of gesture events; and
replacing, by the computing device, at least one gesture event of the portion of the group of gesture events with the mean gesture event.

11. The method of claim 1, further comprising subsequent to removing the at least one gesture event from the group of gesture events to reduce the density of the portion of the group of gesture events, determining, by the computing device, based on the group of gesture events, a selection of one or more keys of the graphical keyboard.

12. A computing device comprising:
at least one processor; and
at least one module operable by the at least one processor to:
receive a group of gesture events based on an input entered at a graphical keyboard, wherein at least two gesture events in the group of gesture events comprise representations of one or more locations of the graphical keyboard;
determine a density of a portion of the group of gesture events if representing at least two gesture events in the portion of the group of gesture events as a single gesture event in the portion of the group of gesture events, wherein the density indicates a quantity of gesture events associated with an area of the graphical keyboard in which locations of the gesture events in the portion of the group of gesture events, if the at least two gesture events of the portion of the group of gesture events are represented as the single gesture event in the portion of the group of gesture events, are located; and
responsive to determining that the density satisfies a threshold, replace the at least two gesture events in the portion of the group of gesture events with the single gesture event in the portion of the group of gesture events to reduce the density of the portion of the group of gesture events.

13. The computing device of claim 12, wherein the quantity is a particular quantity, and the at least one module is further operable by the at least one processor to reduce a total quantity of gesture events in the group of gesture events.

14. The computing device of claim 12, further comprising an input device and a display device, wherein the at least one module is further operable by the at least one processor to:
output, for display at the display device, the graphical keyboard; and
detect, at the input device, the input entered at the graphical keyboard.

15. The computing device of claim 12, wherein the at least one module is further operable by the at least one processor to subsequent to replacing the at least two gesture events in the portions of the group of gesture events with the single gesture event in the portion of the group of gesture events to reduce the density of the portion of the group of gesture events, output, for transmission to an application associated with the graphical keyboard, the modified group of gesture events.

16. The computing device of claim 12, wherein the at least one module is further operable by the at least one processor to:
determine a mean gesture event from the portion of the group of gesture events; and
replace at least one gesture event of the portion of the group of gesture events with the mean gesture event.

17. The computing device of claim 12, wherein the at least one module is further operable by the at least one processor to remove one or more gesture events from the group of gesture events to reduce the density of the portion of the group of gesture events.

18. A computer-readable storage medium encoded with instructions that, when executed, cause at least one processor of a computing device to:
receive a group of gesture events based on an input entered at a graphical keyboard, wherein at least two gesture events in the group of gesture events comprise representations of one or more locations of the graphical keyboard;
determine a density of a portion of the group of gesture events if at least one gesture event is removed from the portion of the group of gesture events, wherein the density indicates a quantity of gesture events associated with an area of the graphical keyboard in which locations of the gesture events in the portion of the group of gesture events, if the at least one gesture event is removed, are located; and
responsive to determining that the density satisfies a threshold, remove the at least one gesture event from the group of gesture events to reduce the density of the portion of the group of gesture events.

* * * * *